(12) United States Patent
Pos (10) Patent No.: US 7,984,947 B2
(45) Date of Patent: Jul. 26, 2011

(54) ROTATABLE CHILD SEAT FOR MOTOR VEHICLES

(75) Inventor: Martin Pos, Bayreuth (DE)

(73) Assignee: Cybex Industrial Ltd., Causeway Bay (HK)

( * ) Notice: Subject to any disclaimer, the term of this patent is extended or adjusted under 35 U.S.C. 154(b) by 330 days.

(21) Appl. No.: 12/095,255

(22) PCT Filed: Nov. 29, 2006

(86) PCT No.: PCT/EP2006/011462
§ 371 (c)(1),
(2), (4) Date: Jul. 3, 2008

(87) PCT Pub. No.: WO2007/062828
PCT Pub. Date: Jun. 7, 2007

(65) Prior Publication Data
US 2008/0290708 A1    Nov. 27, 2008

(30) Foreign Application Priority Data

Nov. 30, 2005  (DE) .......................... 10 2005 057 124
Jul. 4, 2006   (DE) .......................... 10 2006 030 887
Jul. 26, 2006  (DE) .......................... 10 2006 034 557

(51) Int. Cl.
    *A47C 1/08*   (2006.01)
(52) U.S. Cl. ......... 297/256.12; 297/256.14; 297/256.16; 297/250.1
(58) Field of Classification Search ............. 297/256.12, 297/256.14, 256.16, 256.1, 250.1
See application file for complete search history.

(56) References Cited

U.S. PATENT DOCUMENTS

| | | | | |
|---|---|---|---|---|
| 3,934,934 A | * | 1/1976 | Farrell et al. ................... | 297/467 |
| 4,681,368 A | * | 7/1987 | Heath et al. .............. | 297/216.11 |
| 4,971,392 A | * | 11/1990 | Young ...................... | 297/256.12 |
| 6,520,579 B2 | * | 2/2003 | Kassai et al. ............. | 297/256.12 |
| 6,634,708 B2 | * | 10/2003 | Guenther ................. | 297/216.11 |
| 7,029,069 B2 | * | 4/2006 | Hendren et al. ......... | 297/256.12 |

FOREIGN PATENT DOCUMENTS

AU         776444 B2      9/2004

(Continued)

*Primary Examiner* — Laurie K Cranmer
(74) *Attorney, Agent, or Firm* — Drinker Biddle & Reath LLP (57) ABSTRACT

The invention relates to a rotatable child seat (1) for motor vehicles, having a base frame (10) and a seat shell system (20). The base frame (10) is configured to be arranged on a vehicle seat and to be held there by means of an in-vehicle safety belt system. The seat shell system (20) has a seat shell (21) which is rotatable relative to the base frame (10) between a first position, in which the seat shell (21) faces in the direction of travel, and a second position, in which the seat shell (21) faces in the direction opposite to the direction of travel. In order effectively to prevent the seat shell system, when aligned in the second position, from breaking away from the base frame, according to the invention the child seat (1) also has an anchoring belt (29) which, independently of the rotated position of the seat shell system (20) relative to the base frame (10), is guided by guide means (24) over a predetermined first guide region (26) on the rear side of the seat shell system (20) in such a way that the anchoring belt (29) always passes around the pivot axis (A) and that on rotation of the seat shell system (20) from the first position to the second position and vice versa the anchoring belt (29) passes at least partly between the seat shell system (20) and the base frame (10).

20 Claims, 7 Drawing Sheets

FOREIGN PATENT DOCUMENTS

| | | |
|---|---|---|
| DE | 4328635 C2 | 9/1994 |
| EP | 184172 A2 * | 6/1986 |
| EP | 0853018 A1 | 7/1998 |
| EP | 1145898 A | 10/2001 |

* cited by examiner

ROTATABLE CHILD SEAT FOR MOTOR VEHICLES

The invention relates to a rotatable child seat for motor vehicles, having a base frame which has a substantially vertically extending back region and a substantially horizontally extending basal region, the base frame being configured to be arranged on a vehicle seat and to be held there by means of an in-vehicle safety belt system, and having a seat shell system which has a seat shell and a connecting element provided on the underside of the seat shell system, the connecting element being arranged to be brought into engagement with a connecting element constructed so as to be appropriately complementary thereto and provided on the basal region of the base frame in such a way that a force-based connection is formed between the base frame and the seat shell, the seat shell system being rotatable or repositionable relative to the base frame about a substantially vertical pivot axis, formed by the connecting elements, between a first position, in which the seat shell faces in the direction of travel, and a second position, in which the seat shell faces in the direction opposite to the direction of travel.

A rotatable child seat of that kind is generally known. As a rule, the base frame of such a seat is fixed on the rear seat or front seat of a motor vehicle by means of the safety belts present in the motor vehicles. An extremely wide variety of constructions is provided for that purpose, reference being made in that respect only by way of example to the specification DE 43 28 635 C2.

The present invention is concerned primarily with optimising such a child seat so that the seat shell system, especially when aligned in the second position, is effectively prevented from breaking away from the base frame. In particular, the invention is therefore concerned generally with increasing the safety of a child strapped into a child seat. A further objective is to provide a system in which incorrect usage, for example during mounting or installation of the seat shell system, can be virtually ruled out.

In that connection, child seats are available which, altogether, are rotatable out of a position facing in the direction of travel into a position facing in the direction opposite to the direction of travel and vice versa, but they are generally relatively complex constructions which are also correspondingly heavy. For example, the specification EP 1 145 898 A1 discloses a child seat arrangement in which a seat shell system can be arranged either in a position facing in the direction of travel or in a position facing in the direction opposite to the direction of travel, provision being made for the seat shell system to be held by means of the in-vehicle safety belts. In the case of that solution known from the prior art it has proved to be disadvantageous, however, that in the position in which the seat shell faces in the direction opposite to the direction of travel, the safety belts of the vehicle run at the child's head height. Particularly in the case of relatively small motor vehicles, that makes it awkward to take the child out of the seat shell system again, for example at the end of a journey. Furthermore, it requires a great deal of effort to fix the seat shell system in place using the in-vehicle safety belt system. In particular, in the case of this solution known from the prior art, it basically cannot be ensured that the in-vehicle safety belt system has the correct tension for fixing the seat shell system in an optimum way relative to the base frame.

Accordingly, the present invention is based on the problem of developing the child seat system mentioned at the beginning and known from EP 1 145 898 A1 so that the mounting and installation of the seat shell system is simplified, while at the same time the child being secured can be placed in the child seat and taken out again in only a few movements, and even when the seat shell system is in the second position in which the seat shell faces in the direction of travel, the seat shell system remains connected to the base frame by a force-based connection and does not break away or shear off, particularly in extreme situations, such as, for example, in the event of a rear-end collision, etc.

In a child seat of the kind described at the beginning, that problem is solved in accordance with a first aspect of the invention as follows: the seat shell system also has an anchoring belt which, independently of the rotated position of the seat shell system relative to the base frame, is guided by guide means over a predetermined first guide region on the rear side of the seat shell system; the anchoring belt always passes around the substantially vertically extending pivot axis of the seat shell system; and on rotation of the seat shell system from the first position to the second position and vice versa the anchoring belt passes at least partly between the seat shell system and the base frame, so that the seat shell system is held against the base frame by the anchoring belt, provision being made for one end of the anchoring belt to be attached to the base frame and the other end of the anchoring belt to be attached to the base frame or to the seat shell system. It would be possible, for example, for the anchoring belt to be attached by only one end in the upper region of the base frame on the one hand and in the upper region of the seat shell system on the other hand.

In accordance with a second aspect of the invention, in a child seat of the kind mentioned at the beginning the underlying problem is solved as follows: the child seat also has at least one anchoring belt which is attached at least by one end to the base frame and by the other end to the base frame or to the seat shell system, and when the seat shell system is in the second position in which the seat shell faces in the direction opposite to the direction of travel, the anchoring belt, running substantially horizontally, is under tensile stress and accordingly makes it possible for a counter-force with respect to at least some of the forces acting on the seat shell system and directed in the direction of travel to be transmitted from the seat shell system by way of the anchoring belt to the base frame, so that with the aid of the anchoring belt the seat shell system is held against the base frame.

The key aspect of the present invention therefore lies in the fact that according to the invention the seat shell is held not only with the aid of the in-vehicle safety belts, but also by means of a belt belonging to the child seat, in addition to the force-based connection formed with the aid of the connecting element provided on the underside of the seat shell system and the connecting element constructed so as to be complementary thereto and provided on the basal region of the base frame. By the provision of the anchoring belt there is advantageously achieved, in principle, optimum anchoring of the seat shell system in respect of the base frame. The provision of guide means which, independently of the rotated position of the seat shell system relative to the base frame, guide the anchoring belt over a predetermined first guide region on the rear side of the seat shell system in such a way that the anchoring belt always passes around the substantially vertically extending pivot axis of the seat shell system and that, on rotation of the seat shell system from the first position to the second position and vice versa, the anchoring belt passes at least partly between the seat shell system and the base frame, also has the advantageous result, on the one hand, that the rotatability of the seat shell system relative to the base frame is not affected and, on the other hand, that the seat shell system is adequately attached to the base frame and accordingly, by means of the in-vehicle safety belt system, also to the vehicle frame.

In the first aspect of the invention, in particular the provision of a predetermined first guide region on the rear side of the seat shell system, which guide region is provided in a fixed position on the rear side of the seat shell system, independently of the rotated position of the seat shell system relative to the base frame, ensures as a result of the pre-established length of the anchoring belt that there is optimum transmission of force between the seat shell system and the base frame by way of the anchoring belt, especially independently of the particular rotated position of the seat shell system. On the other hand, the predetermined (first) guide region on the rear side of the seat shell system always guarantees smooth-running guidance of the anchoring belt. In detail, on rotation of the seat shell system about the substantially vertically extending pivot axis, a relative movement takes place between the anchoring belt and the seat shell system. The predetermined guide region on the rear side of the seat shell system ensures that that relative movement follows an intended course. In particular, the anchoring belt can accordingly effectively be prevented from becoming caught or otherwise jammed, for example, between the seat shell system and the base frame.

At the same time, the anchoring belt is preferably guided, independently of the rotated position of the seat shell system, so that the anchoring belt does not run, for example, at the head height of the child, but runs along the lower region of the seat shell in order thus to make it easier to put the child into the seat shell system or the seat shell. Conventional bolt connections can be used for attaching the respective ends of the anchoring belt to the base frame, but other arrangements are also possible here.

In the second aspect of the invention, the child seat has an anchoring belt which, when the seat shell is in the second position in which the seat shell faces in the direction opposite to the direction of travel, is tensioned running substantially horizontally between the seat shell system and the base frame in order to provide additional hold for the seat shell system on the base frame. In respect of the configuration and properties of the anchoring belt, the comments made in connection with the first aspect of the invention also apply to the second aspect. In particular, one end of the anchoring belt is attached to the base frame, preferably to the upper region of the base frame, and the other end of the anchoring belt is attached to the base frame or to the seat shell system.

It is true of both aspects of the invention that, according to the configuration of the child seat, the anchoring belt can be attached by both of its ends to the lower end or to the upper end of the substantially vertically extending back region of the base frame. As an alternative thereto, in the second aspect of the invention it would also be possible for the anchoring belt to be attached by one of its ends to the lower end or to the upper end of the substantially vertically extending back region of the base frame, while the other end is attached preferably to the head region of the seat shell.

Advantageous developments of the two aspects of the invention are defined in the subsidiary claims.

In order that mounting and installation of the child seat require only a minimum number of movements by the user, in a preferred development the anchoring belt has a pre-established length.

On the other hand, it would also be possible for the child seat to have, preferably on the side region or back region of the seat shell system, at least one manually actuatable tensioning means for changing the length of the anchoring belt, thus facilitating rotation of the child seat because, for example in the arrangement in accordance with the first aspect of the invention, the anchoring belt in its loosened state rubs only slightly against the seat shell system. By the provision of the tensioning means, the anchoring belt can then be tightened and suitably tensioned.

In a preferred realisation of the child seat according to the invention, the predetermined first guide region on the rear side of the seat shell system has, arranged on the seat shell system, a guide member over or through which the anchoring belt is guided. In such an arrangement it would be possible for the guide member to have an eyelet or an eyelet-like element through which the anchoring belt is guided. The term "eyelet" or "eyelet-like element" used herein is to be understood as denoting a passageway in the shape of a ring or oblong hole through which the anchoring belt passes. The shaping of the passageway through which the anchoring belt passes can also be appropriately matched to the cross-sectional geometry of the anchoring belt in order thus to facilitate the best possible guidance of the anchoring belt through the guide member.

It would also be possible, however, for the guide member, in addition to or as an alternative to having the eyelet-like element or the eyelet, to have a sleeve element over which the anchoring belt is guided. That sleeve element is advantageously a rotatably mounted sleeve, especially a horizontal sleeve, but it will be understood that other forms of the guide member are also possible.

The guide member is preferably constructed on or integrally with the rear side of the seat shell system. It would be possible, for example, for the rear side of the seat shell system to be configured so that the guide member is already present for structural reasons on the first guide region of the rear side of the seat shell system. It would be possible, for example, for structure-related struts on the rear side of the seat shell system to be used as guide members. It will be understood, however, that it is also possible for the first guide region predetermined on the rear side of the seat shell system to be based on appropriately chosen shaping of the rear side of the seat shell system.

In order that the anchoring belt, on being guided over the guide member in the form of a sleeve element on the rear side of the seat shell system, provides an optimum hold for the seat shell system on the base frame, while at the same time being guided in a way that is as smooth-running as possible, in a preferred realisation of the last-mentioned embodiment of the child seat according to the invention the sleeve element acting as guide member is constructed in such a way that the anchoring belt, on being guided over the sleeve, is turned through approximately 180°. In other words, the anchoring belt is guided over the sleeve element in such a way that the anchoring belt is at least partly looped around the sleeve element.

In order that, independently of the rotated position of the seat shell system, the anchoring belt always runs through the first guide region provided on the rear side of the seat shell system and that, furthermore, on rotation of the seat shell system from the first position to the second position and vice versa, the anchoring belt always runs at least partly between the seat shell system and the base frame, the guide means preferably also have at least one guide eyelet or eyelet-like guide element rigidly connected to the seat shell system. As already indicated above, the term "eyelet" or "eyelet-like element" is to be broadly interpreted herein. In particular, a clip-like or clasp-like construction also comes into consideration here. By the provision of those additional guide means it can, in principle, be ensured that, on rotation of the seat shell system relative to the base frame, the anchoring belt is guided along an intended course.

In respect of the path followed by the anchoring belt between the seat shell system and the base frame when the seat shell system is rotated relative to the base frame, the guide means—in addition to having the predetermined first guide region on the rear side of the seat shell system—advantageously have a further, second guide region which extends between the seat shell system and the base frame and in which the anchoring belt is guided on rotation of the seat shell system from the first position to the second position and vice versa. That second guide region is, in particular, not a rigidly positioned guide member or a corresponding guide rail, but rather the second guide region in fact takes the form of a region between the seat shell system and the base frame in which the anchoring belt can run freely when the seat shell system is rotated relative to the base frame.

The second guide region is preferably limited by the outer periphery of the seat shell, the seat shell here advantageously being in the form of a shell-shaped moulded part.

In a preferred development of the child seat, the seat shell system can have, arranged between the seat shell and the base frame, an intermediate frame into which the seat shell can be placed and to which the seat shell can be attached, preferably releasably, using appropriately provided anchoring means. In that case, the second guide region is defined substantially along the periphery of that intermediate frame. In principle, the second guide region and accordingly the path along which the anchoring belt is guided between the seat shell system and the base frame can be influenced by appropriately selected shaping of the outer periphery of the seat shell or of the intermediate frame. By the provision of the intermediate frame between the seat shell and the base frame, the seat shell can be attached in various adjustable lying and sitting positions in the seat shell system. It will be understood, however, that other solutions are also possible for that purpose.

In order that the seat shell as such can be removed from the child seat arrangement, in an advantageous development the connecting element provided on the underside of the seat shell system and the connecting element constructed so as to be complementary thereto and provided on the basal region of the base frame are each configured in such a way that a releasable connection is formed between the base frame and the seat shell system. The connection is preferably released by actuating an appropriately constructed actuating means provided for that purpose. It would be possible here to use releasable latching members as connecting elements. It will be understood, however, that other arrangements are also possible.

In order that the seat shell or the seat shell system can be locked relative to the base frame, in a further preferred development the seat shell system also has corresponding locking means which co-operate with the seat shell system on the one hand and with the base frame on the other hand in such a way that, on actuation of the locking means, the seat shell system is prevented from performing a rotational movement relative to the base frame. It would be possible here, for example, for the force-based connection between the base frame and the seat shell system, which connection is formed by the connecting element provided on the underside of the seat shell and the connecting element constructed so as to be appropriately complementary thereto and provided on the basal region of the base frame, to be secured against rotation by means of an appropriately provided locking means. Suitable locking means are known from the prior art and are not described in detail herein.

Finally, in a preferred realisation of the child seat according to the invention, the base frame has a shell-shaped moulded part and/or a frame. It will be understood, however, that other arrangements are also possible.

A preferred embodiment of the child seat according to the invention is described in detail below with reference to the accompanying drawings.

Figure 1:
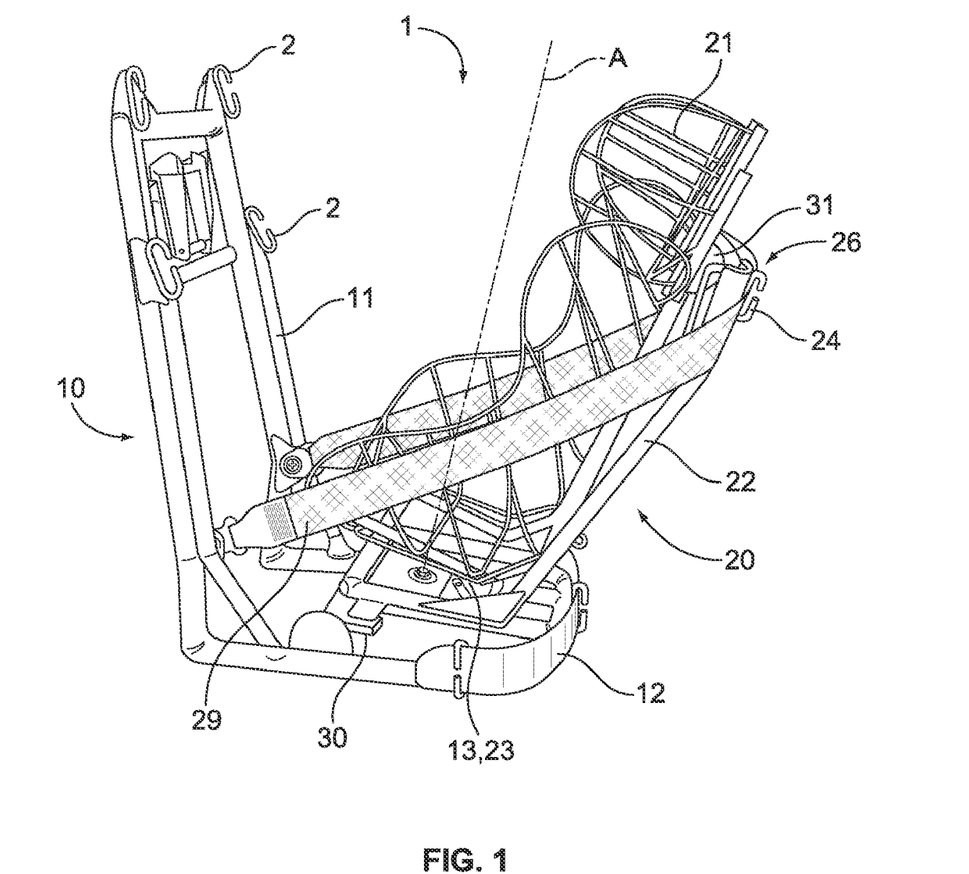
FIG. 1 is a perspective diagrammatic side view of a preferred embodiment of the child seat according to the invention in its second position in which the seat shell is facing in the direction opposite to the direction of travel.

FIG. 1 shows a preferred embodiment of the child seat 1 according to the invention in its second position in which the seat shell system 20 is facing in a direction opposite to the vehicle (not explicitly shown). The child seat 1 consists of a base frame 10, which in the preferred embodiment shown is in the form of a frame component; it would also be possible, however, for the base frame 10 to be implemented in the form of a shell-shaped moulded part.

The base frame 10 has a substantially vertically extending back region 11 and a substantially horizontally extending basal region 12 and is configured to be arranged on a vehicle seat (not explicitly shown) and held there by an in-vehicle safety belt system. For that purpose, corresponding belt guides 2 are provided on the base frame 10. The attachment of the base frame 10 to a vehicle seat is effected in a way known from the prior art and is not described herein.

The child seat 1 according to the invention has—as already indicated—the seat shell system 20 which is depicted in the figures as an appropriately shaped skeleton structure. The seat shell system 20 has essentially a seat shell 21, into which the child or baby is placed and strapped during travel, and a connecting element 23 provided on the underside of the seat shell system 20. In the assembled state, that connecting element 23 is in engagement with a connecting element 13 constructed so as to be appropriately complementary thereto and provided on the basal region 12 of the base frame 10, so that a force-based connection is formed between the base frame 10 and the seat shell system 20, the seat shell system 20 at the same time being rotatable or repositionable relative to the base frame 10 about a substantially vertical pivot axis A formed by the connecting elements 13 and 23.

Figure 2:
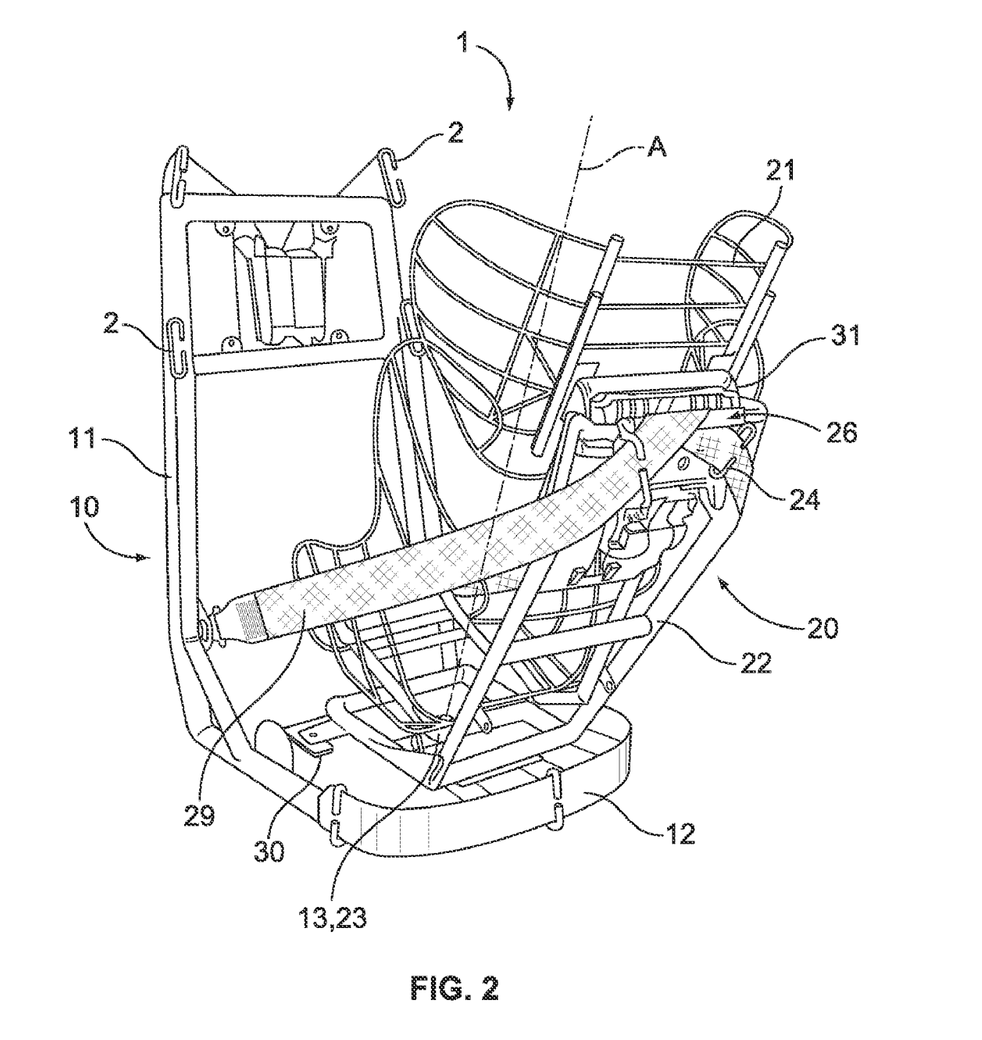
FIG. 2 is a perspective view of the rear side of the seat shell system of the child seat shown diagrammatically in FIG. 1.
Figure 3:
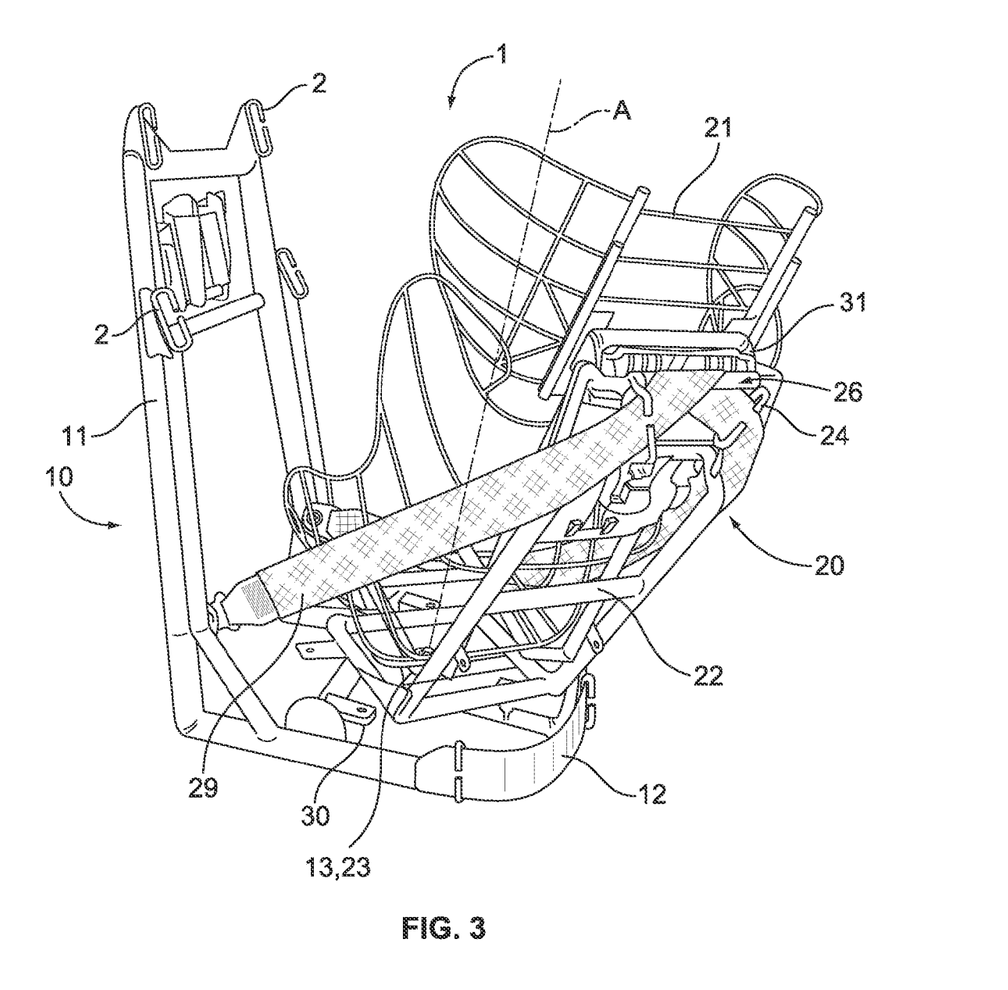
FIG. 3 is a perspective view of the child seat shown in FIG. 1, the child seat having been pivoted out of the second position shown in FIG. 1 towards the first position in which the seat shell is facing in the direction of travel.
Figure 4:
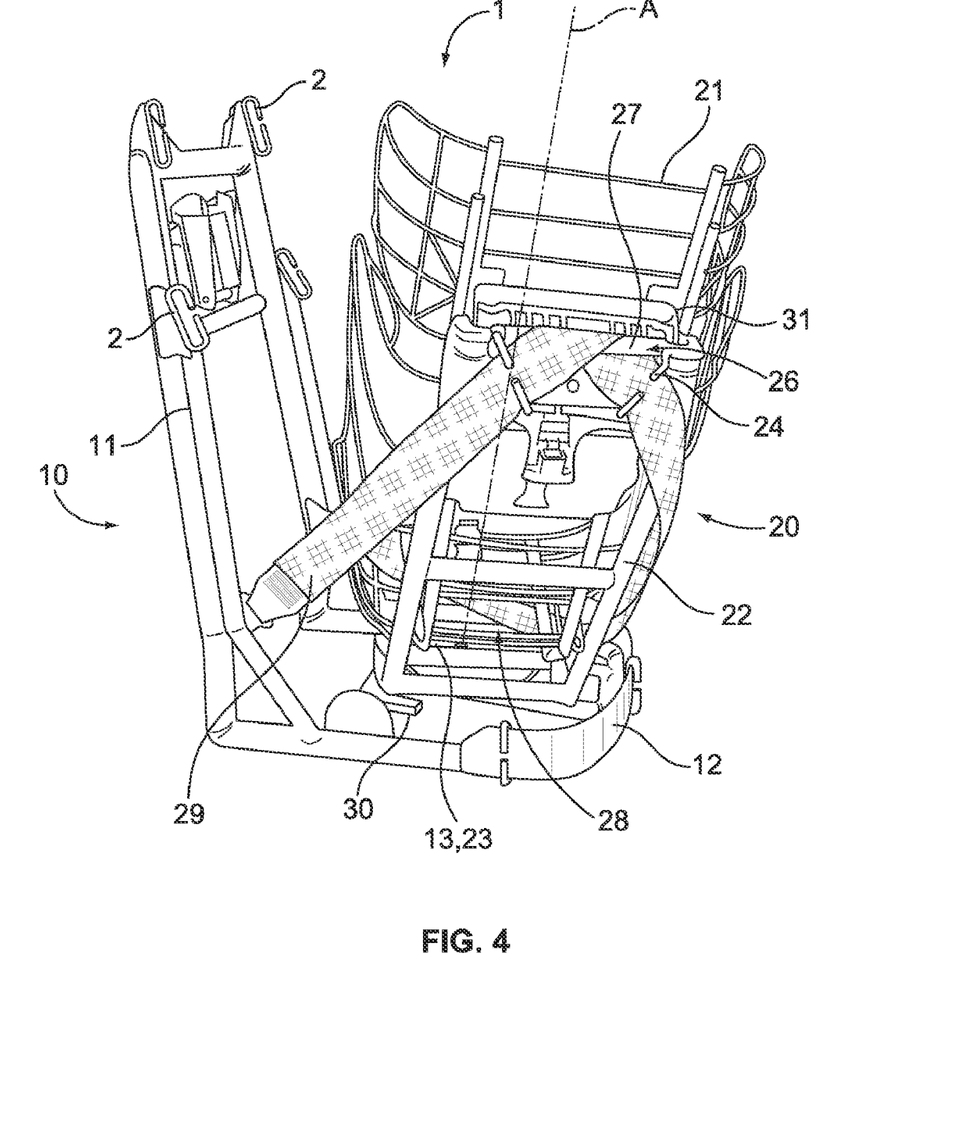
FIG. 4 is a diagrammatic view of the child seat according to FIG. 1, the seat shell system having been pivoted further towards the first position in comparison with the rotated position shown in FIG. 3.
Figure 5:
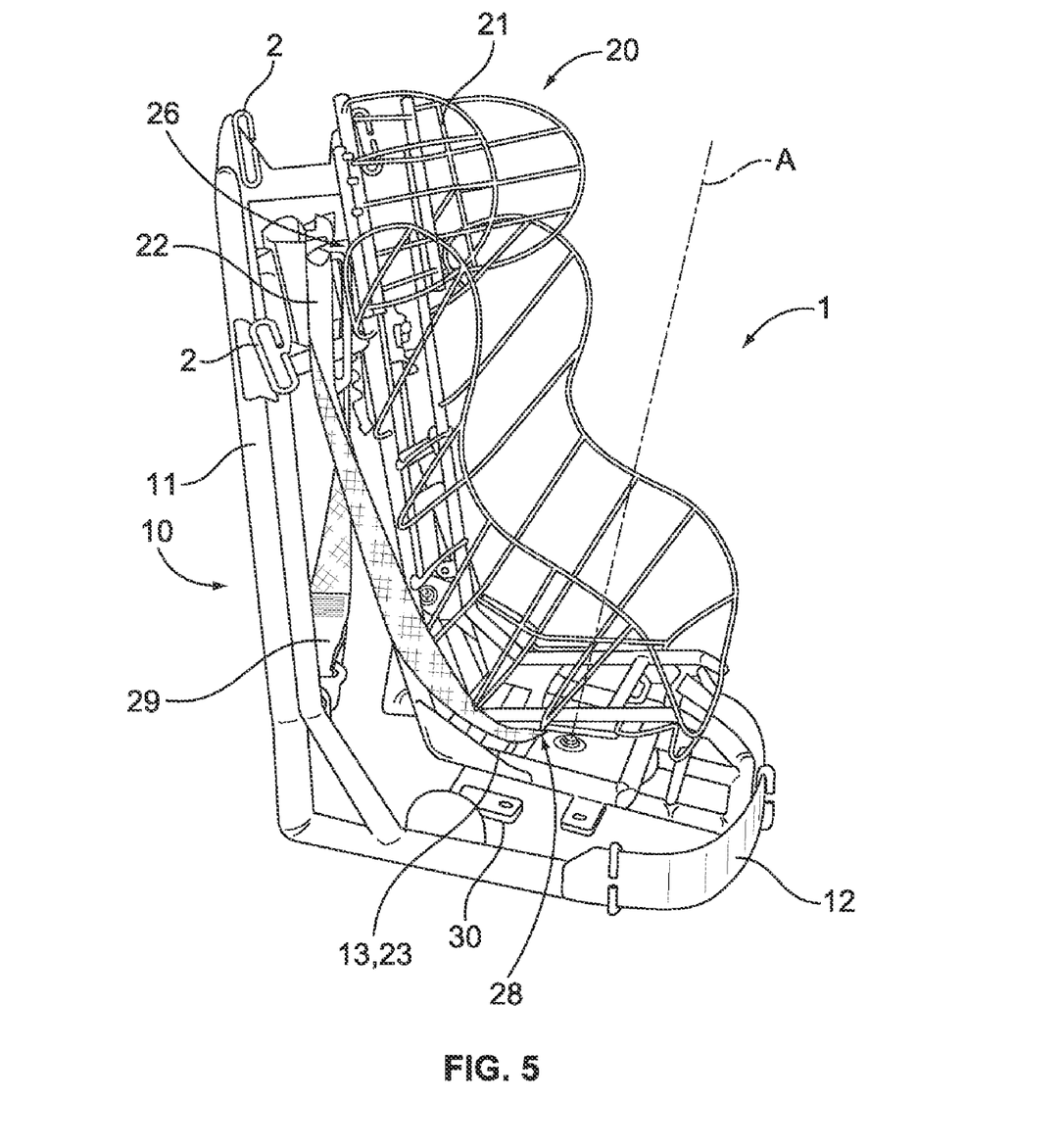
FIG. 5 is a perspective side view of the child seat according to FIG. 1 in its first position in which the seat shell faces in the direction of travel of the vehicle.

FIGS. 1 to 5 show various rotated positions of the seat shell system 20 relative to the base frame 10, beginning with the second position in which the seat shell 21 is facing in the direction opposite to the direction of travel of the vehicle (not shown) (see FIGS. 1 and 2), passing through intermediate positions in FIGS. 3 and 4 to the first position in which the seat shell 21 is facing in the direction of travel (see FIG. 5).

Although in the figures the seat shell system 20 is shown being rotated in the clockwise direction, it will be understood that rotation in the anticlockwise direction is also possible.

Although a force-based connection is formed between the seat shell system 20 and the base frame 10 by the connecting elements 13 and 23, that connection is not sufficient to hold the seat shell system 20, possibly with a child seated therein, securely on the base frame 10 if, for example, relatively great forces are exerted on the components of the child seat 1 as a result, for example, of the vehicle's performing braking manoeuvres. For that reason, the child seat 1 also has an anchoring belt 29, for example of a pre-established length, which is attached by both its ends to the base frame 10. In the embodiment shown, that attachment is effected by means of bolts. The figures also show that the anchoring belt 29 can correspond to a customary commercial seat belt of a vehicle.

The anchoring belt 29 is guided with the aid of guide means 24 around the region of the seat shell system 20 facing in the vehicle direction in FIG. 1. In detail, in the solution according to the invention the anchoring belt 29 is guided by the guide means 24, independently of the rotated position of the seat shell system 20 relative to the base frame 10, in such a way that the anchoring belt 29 always runs over a first predetermined guide region 26 arranged on the rear side of the seat shell system 20. The first guide region 26 is shown in detail in FIG. 6.

Furthermore, the anchoring belt 29 is guided by the guide means 24 so that the belt 29—likewise independently of the rotated position of the seat shell system 20 relative to the base frame 10—always passes around the pivot axis A. In other words, the anchoring belt 29 basically runs in front of the pivot axis A relative to the vehicle direction.

The length of the anchoring belt 29 can be changed, for example, with the aid of a tensioning means. It would also be possible, however, for the anchoring belt 29 to have a pre-established length which is also not changed when the child seat 1 is mounted on the vehicle seat. The anchoring belt 29 basically assumes the function of holding the seat shell system 20 on the basal region 12 of the base frame 10.

In the preferred embodiment of the child seat 1, the guide means 24 take the form of guide clips which are suitably arranged rigidly on the rear side of the seat shell system 20. Those guide clips are also referred to herein as "eyelet-like guide elements".

FIGS. 3 and 4 show the preferred embodiment of the child seat 1 according to the invention, the rotated position of the seat shell system 20 here being different from the second position shown in FIGS. 1 and 2 in which the seat shell 21 is facing in the direction opposite to the direction of travel. FIG. 5 shows the child seat 1 in a rotated position in which the seat shell system 20 is in the first position in which the seat shell 21 is facing in the direction of travel. A feature common to all rotated positions other than the second position is that the anchoring belt 29 runs at least partly between the seat shell system 20 and the base frame 10. That region in which, on rotation of the seat shell system 20 from the first position to the second position and vice versa, the anchoring belt runs between the seat shell system 20 and the base frame 10 is referred to herein as the second guide region 28.

The second guide region 28 is defined essentially by the outer periphery of the seat shell system 20 or the seat shell 21 and the outer periphery of the basal region 12 of the base frame 10. The outer periphery of the basal region 12 is located opposite the outer periphery of the underside of the seat shell system 20. It will be understood in respect of the second guide region 28, however, that here too there are provided guide means that appropriately influence the path of the anchoring belt 29.

The technical realisation of the predetermined first guide region 26 arranged on the rear side of the seat shell system 20 will be discussed in greater detail below. For that purpose, reference is made particularly to FIG. 6. As shown, the predetermined first guide region 26 on the rear side of the seat shell system 20 has a guide member 27 arranged on the seat shell system 20, which guide member, in the embodiment shown, is a rotatably mounted horizontal sleeve over which the anchoring belt 29 is guided. It would also be possible, however, for the guide member 27 to be in the form of an eyelet or eyelet-like element.

Figure 6:
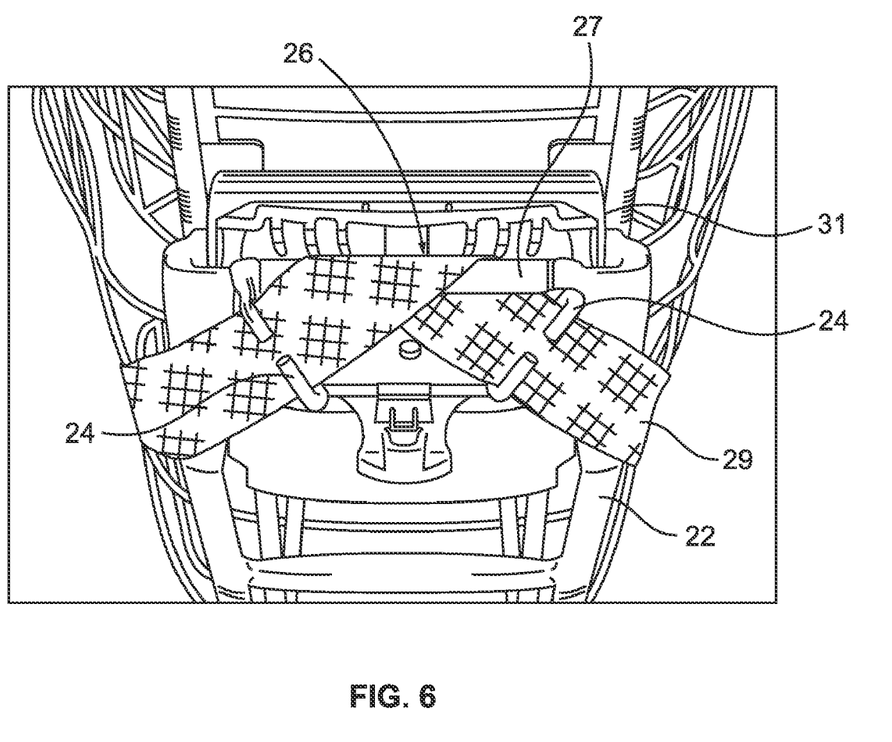
FIG. 6 is a plan view of the first guide region of the preferred embodiment of the child seat according to the invention.

The rotatably mounted horizontal sleeve 27 is arranged, preferably rotatably, on the rear side of the seat shell system 20, with the anchoring belt 29 being rotated through 180° on being guided over the sleeve 27. Suitable positioning of the anchoring belt 29 on the horizontal sleeve 27 is effected by means of the corresponding guide means 24.

In order that the seat shell system 20 is prevented from performing a rotational movement relative to the base frame 10 and that a certain rotated position of the seat shell system 20 can be fixed, the seat shell system 20 has a locking means in the form of a clamping device which is arranged to be brought into engagement with the anchoring belt 29, preferably on the first guide region 26, in order to form a force-based clamping connection between the anchoring belt 29 and the seat shell system 20. It is thus possible to prevent the seat shell 21 from performing a rotational movement relative to the base frame 10. It will be understood that in this case, however, it would also be possible to provide on the seat shell system 20 an actuatable locking means 30 which co-operates with the seat shell 21 on the one hand and with the base frame 10 on the other hand in such a way that, on actuation of the locking means 30, rotational movement of the seat shell 21 relative to the base frame 10 can be prevented.

Although not explicitly shown, the child seat 1 according to the invention is advantageously arranged in such a way that the seat shell 21 can be separated from the base frame, it being possible for the seat shell 21 to be connected, for example by a releasable snap connection, to the seat shell system 20, which in turn has on its underside the connecting element 23 which is arranged to be brought into engagement with the connecting element 13 constructed so as to be complementary thereto and provided on the basal region 12 of the base frame 10.

Figure 7:
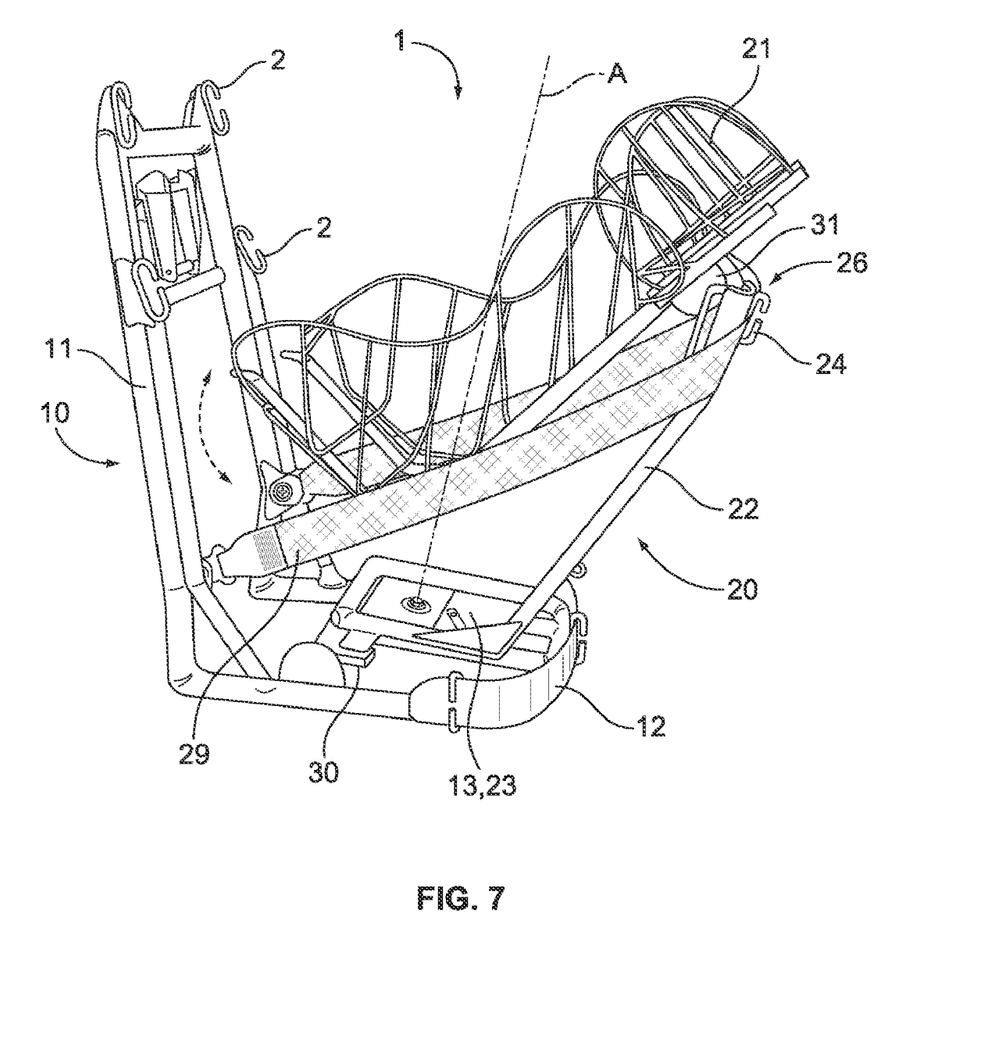
FIG. 7 is a perspective diagrammatic side view of the child seat according to FIG. 1 showing that the seat shell can be attached in various adjustable lying and sitting positions in the seat shell system.

Preferably, the seat shell system 20 of the child seat 1 also has an intermediate frame 22 which is arranged between the seat shell 21 and the base frame 10 and into which the seat shell 21 can be placed and to which the seat shell 21 can be attached, preferably releasably, with appropriately provided anchoring means 31, the intermediate frame 22 or the anchoring means 31 between the intermediate frame 22 and the seat shell 21 being configured in such a way that the seat shell 21 can be attached in various adjustable lying and sitting positions in the seat shell system 20, as shown in FIGS. 1 and 7.

All the features disclosed in the application documents are claimed as being important to the invention, provided that they are novel, either individually or in combination, over the prior art.

LIST OF REFERENCE NUMERALS 1 child seat
2 vehicle seat belt guide
10 base frame 11 back frame
12 basal region
13 connecting element
20 seat shell system
21 seat shell
22 intermediate frame
23 connecting element
24 guide means
26 first guide region
27 guide member
28 second guide region
29 anchoring belt
30 locking means
31 anchoring means
A pivot axis

The invention claimed is:

1. A rotatable child seat for motor vehicles, comprising:
a base frame which includes a substantially vertically extending back region and a substantially horizontally extending basal region, the base frame being configured to be arranged on a vehicle seat and to be held in place on the vehicle seat using an in-vehicle safety belt system;
a seat shell system which includes a seat shell and a connecting element provided on an underside of the seat shell system, the connecting element engaging with a complementary connecting element on the basal region of the base frame to form a force-based connection between the base frame and the seat shell system and to form a substantially vertical pivot axis, the seat shell system being rotatable or repositionable relative to the base frame about the substantially vertical pivot axis between a first position, in which the seat shell faces in a direction of travel, and a second position, in which the seat shell faces in a direction opposite to the direction of travel; and
at least one anchoring belt that holds the seat shell system against the base frame, at least a first end of the anchoring belt being attached to the base frame,
wherein the seat shell system further includes at least one guide element that guides the anchoring belt over a predetermined first guide region on a rear side of the seat shell system in such a way that the anchoring belt passes around the pivot axis independently of a rotated position of the seat shell system relative to the base frame, and
wherein on rotation of the seat shell system from the first position to the second position and vice versa, the anchoring belt passes at least partly between the seat shell system and the base frame.

2. The rotatable child seat according to claim 1, wherein the anchoring belt is disposed along a substantially diagonal path from a lower region of the base frame to an upper region of the rear side of the seat shell system such that when the seat shell system is in the second position in which the seat shell faces in the direction opposite to the direction of travel, the anchoring belt is under tensile stress and accordingly holds the seat shell system in place against the base frame counter to forces acting on the seat shell system and directed in the direction of travel.

3. The rotatable child seat according to claim 1, at least one end of the anchoring belt being attached to a lower region of the substantially vertically extending back region of the base frame.

4. The rotatable child seat according to claim 1, the anchoring belt having a pre-established length.

5. The rotatable child seat according to claim 1, wherein a length of the anchoring belt is changeable to alternately facilitate rotation of the seat shell system and hold the seat shell system in place relative to the base frame.

6. The rotatable child seat according to claim 1, wherein the at least one guide element includes a guide member that guides the anchoring belt over the predetermined first guide region on the rear side of the seat shell system.

7. The rotatable child seat according to claim 6, the guide member being associated with an eyelet or an eyelet-like element through which the anchoring belt is guided.

8. The rotatable child seat according to claim 6, the guide member having a rotatably mounted horizontal sleeve over which the anchoring belt is guided.

9. The rotatable child seat according to claim 8, the guide member rotating the anchoring belt by 180° over the sleeve.

10. The rotatable child seat according to claim 1, the at least one guide element including at least one guide eyelet or eyelet-like element rigidly connected to the seat shell system.

11. The rotatable child seat according to claim 1, the guide element including a second guide region, different from the predetermined first guide region on the rear side of the seat shell system, which second guide region extends between the seat shell system and the base frame and in which the anchoring belt is guided during rotation of the seat shell system from the first position to the second position and vice versa.

12. The rotatable child seat according to claim 11, the seat shell having a structural shape of a shell-shaped moulded part and the second guide region extending substantially along the periphery of the moulded part.

13. The rotatable child seat according to claim 11, the seat shell system also including, arranged between the seat shell and the base frame, an intermediate frame into which the seat shell is placed and to which the seat shell is releasably attached, the second guide region extending substantially along a periphery of the intermediate frame.

14. The rotatable child seat according to claim 13, the seat shell being attachable to the intermediate frame in various adjustable lying or sitting positions in the seat shell system.

15. The rotatable child seat according to claim 1, the connecting element provided on the underside of the seat shell system releasably engaging with the complementary connecting element on the basal region of the base frame such that a releasable connection is formed between the base frame and the seat shell system.

16. The rotatable child seat according to claim 1, the seat shell system also including an actuatable locking element which co-operatively locks a relative position between the seat shell system and the base frame in such a way that, upon actuation of the locking element, the seat shell system is prevented from performing a rotational movement relative to the base frame.

17. The rotatable child seat according to claim 1, the base frame having a shell-shaped moulded part or a frame.

18. The rotatable child seat according to claim 1, at least one end of the anchoring belt being attached to an upper region of the substantially vertically extending back region of the base frame.

19. The rotatable child seat according to claim 1, a second end of the anchoring belt being attached to the base frame.

20. The rotatable child seat according to claim 1, a second end of the anchoring belt being attached to an upper region of the seat shell system.

* * * * *